G. O. PARKER.
COUPLING.
APPLICATION FILED JULY 29, 1914.

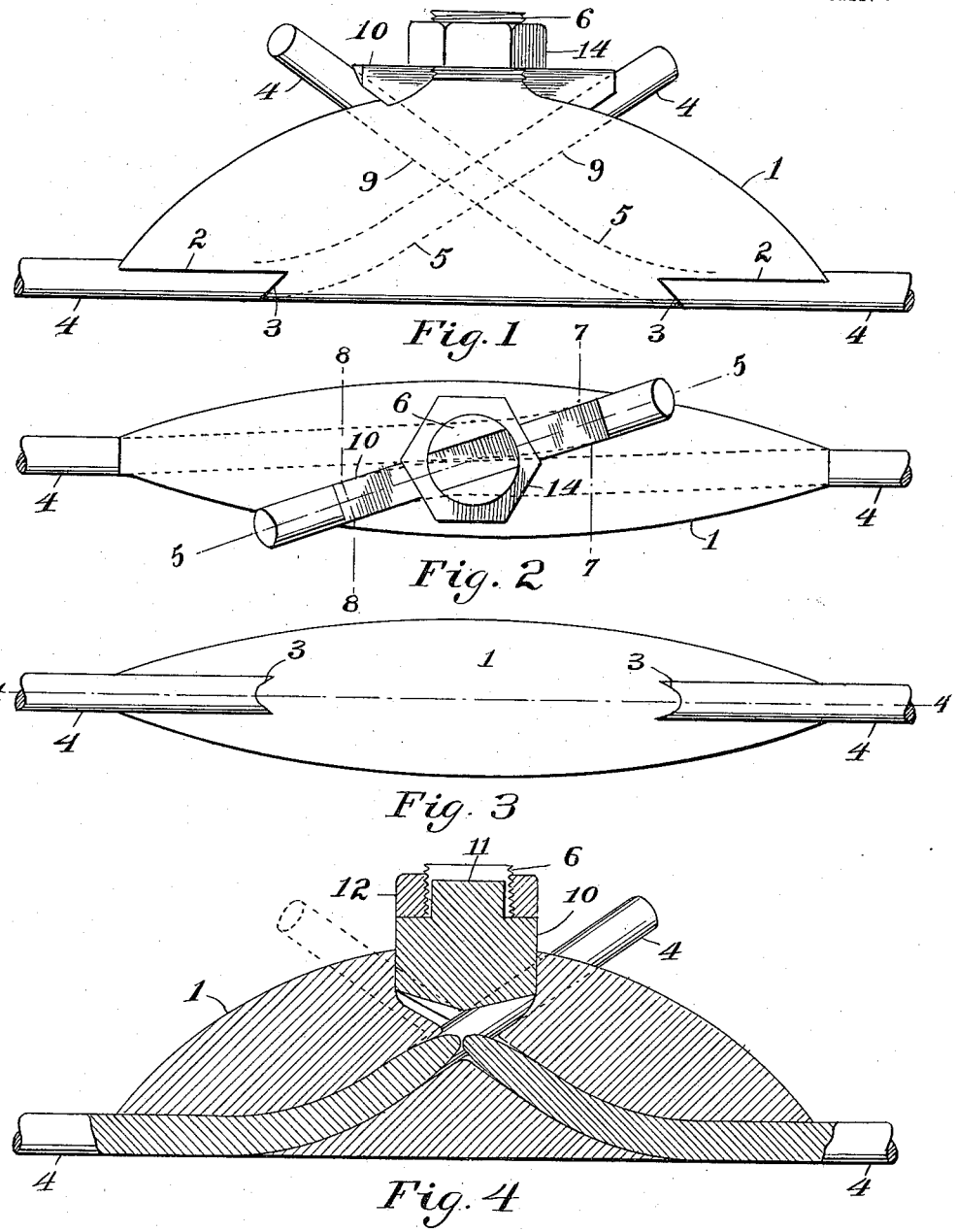

1,158,714.

Patented Nov. 2, 1915.
2 SHEETS—SHEET 2.

Inventor
Guy. O. Parker,
By Victor J. Evans
Attorney

Witnesses
C. F. Rudolph
Fro. Ackman Jr.

UNITED STATES PATENT OFFICE.

GUY O. PARKER, OF TAMPA, FLORIDA.

COUPLING.

1,158,714.  Specification of Letters Patent.  Patented Nov. 2, 1915.

Application filed July 29, 1914. Serial No. 853,944.

*To all whom it may concern:*

Be it known that I, GUY O. PARKER, a citizen of the United States, residing at Tampa, in the county of Hillsborough and State of Florida, have invented new and useful Improvements in Couplings, of which the following is a specification.

This invention relates to an improvement in connectors or couplers for the trolley wires of electric railways.

In carrying out my invention it is my purpose to provide a connector or coupler for connecting the adjacent ends of a trolley wire in such a manner that the trolley wire will be insured a smooth and uninterrupted track across the joint. I also aim to provide a coupler or connector for the ends of a trolley wire which has grooves to receive the wire and angularly arranged or inclined holes through which the ends pass, the top of the coupler being provided with a threaded extension which is slotted angularly to communicate with the side walls of a substantially V-shaped slot which is formed at the top of the coupler and which has its lower walls arranged in a plane with the angular lower walls of the holes through which the wires pass, a wedge member being received within the V-shaped slot to force the wires against the walls of the said slot, and a nut being provided for the threaded extension which binds upon the wedge member to insure the retaining of the wire ends against displacement, and also to permit of the removal of the said ends from the coupler when desired.

With the above and other objects in view, the improvement resides in the construction, combination and arrangement of parts set forth in the following specification and falling within the scope of the appended claims.

Figure 5:
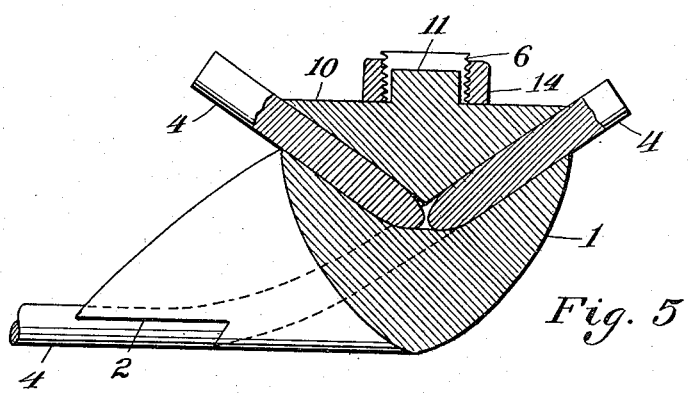
Figure 6:
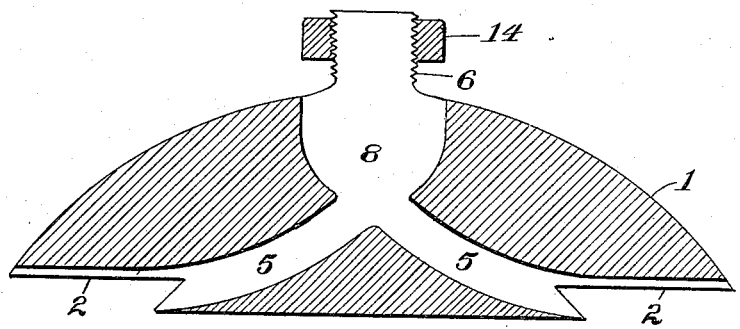
Figures 7, 8:
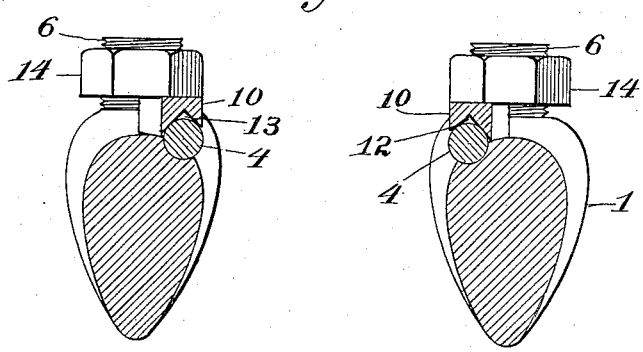

In the drawings: Figure 1 is a side elevation of my improvement, Fig. 2 is a top plan view of the same, Fig. 3 is a bottom view of the same, Fig. 4 is a longitudinal sectional view on the line 4—4 of Fig. 3, Fig. 5 is a sectional view on the line 5—5 of Fig. 2, Fig. 6 is a view similar to Fig. 4 with the wires and wedge member removed, Fig. 7 is a transverse sectional view on the line 7—7 of Fig. 2, Fig. 8 is a similar sectional view on the line 8—8 of Fig. 2.

The numeral 1 designates a connector or coupler formed of some suitable metal, galvanized to protect the same from the weather. The ends of the coupler 1 are preferably rounded or inclined from the top portion thereof to the lower corners, and the underface of the said coupler, at its corners are cut-away longitudinally as indicated by the numerals 2, the inner walls provided by the said cut-away portions being preferably angular, as at 3, and the upper walls of the portions 2 are grooved to receive the ends 4—4 of the conductor wire. The lower face of the coupler between the shoulders 3—3 has its longitudinal edges preferably rounded, and is arranged in a line with the lower faces of the wire ends 4—4. The ends of the trolley wire pass upwardly through inclined holes 5—5′ which extend through the connector in different planes. The top of the connector is formed with a centrally arranged threaded extension 6 which is centrally slotted in an angular direction and the side walls formed by the said slot are arranged flush with the side walls provided by a substantially V-shaped depression or pocket 8 arranged upon the upper face of the coupler. The lower and angular walls 9—9′ of the said pocket are arranged in a line with the lower walls of the angular holes 5—5′, so that the wire ends cross each other centrally of the coupler and are received upon the respective lower walls 9—9′ of the pocket.

The numeral 10 designates a substantially V-shaped wedge member which is centrally provided with a stem 11, and which has its lower angular faces formed with substantially V-shaped grooves 12—13 respectively. By reference to Figs. 7 and 8 of the drawings it will be noted that one of the side walls provided by one of the V-shaped grooves 12—13 is extended below the plane of the opposite side wall of the said groove, and the extending side walls of the respective grooves 12—13 are arranged upon the opposite sides of the head of the wedge 10.

The numeral 14 designates a nut which is adapted to be screwed upon the threaded extension 6 of the connector or coupler and which is adapted to frictionally contact with the upper face of the wedge 10 to the opposite sides of its stem 11, to force the said wedge to within the pocket 8 to bind against the wire ends 4—4′, the extending side of one of the grooved lower faces 12 or 13 of the wedge forcing one of the said wire ends against both of the lower angular walls of the pocket and against one of the sides of the pocket, the second extending or projecting lower edge of the said wedge forcing the second wire against the second wall of the pocket as well as against the opposite side of said pocket, as will be understood.

As it is evident that many changes in the form and construction of parts might be resorted to without departing from my invention, it is to be understood that I do not restrict myself to the particular construction shown and described.

Having thus described the invention, what I claim is:

1. A trolley wire connector or coupler having its lower face rounded and cut-away longitudinally at its corners and the walls provided by the said cut-away portions grooved to receive the ends of a wire to sustain the said wire flush with the rounded lower face of the coupler, the said coupler having its upper edge centrally provided with a threaded stem which is bifurcated at an angle, the said upper face of the coupler having a V-shaped pocket, the side walls of which are arranged flush with the inner walls of the bifurcated threaded extension, said coupler having inclined holes which communicate centrally with the pocket and with the grooved lower corners of the coupler, the ends of the mentioned wire extending through the holes and resting upon the inclined walls of the pocket, a substantially V-shaped wedge within the pocket and extending above the coupling, and a nut upon the threaded extension and engaging with the wedge.

2. A trolley wire connector or coupling having its lower face rounded and cut-away longitudinally at its corners and the walls provided by the said cut-away portions being grooved to receive the ends of a wire and to retain the said wire flush with the rounded lower face of the coupler, the said coupler having its upper edge centrally provided with a threaded stem which is bifurcated at an angle, the said upper face of the coupler having a V-shaped pocket, the side walls of which are arranged flush with the inner walls of the bifurcated threaded extension, said coupler having inclined holes which communicate centrally with the pocket and with the grooved lower corners of the coupler, the ends of the mentioned wire extending through the holes and resting upon the inclined walls of the pocket, a V-shaped wedge within the pocket and extending thereabove, the said wedge having a shank which is arranged within the bifurcated threaded extension, and a nut upon the extension and co-acting with the wedge to force the same within the pocket against the ends of the wire.

In testimony whereof I affix my signature in presence of two witnesses.

GUY O. PARKER.

Witnesses:
GEORGE H. WYGANT,
G. B. HENDERSON.

Copies of this patent may be obtained for five cents each, by addressing the "Commissioner of Patents, Washington, D. C."